Nov. 6, 1923.
G. WALTHER
1,473,366
BRAKE DRUM
Filed July 31, 1922
2 Sheets-Sheet 1
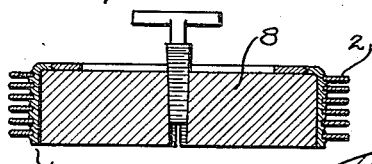
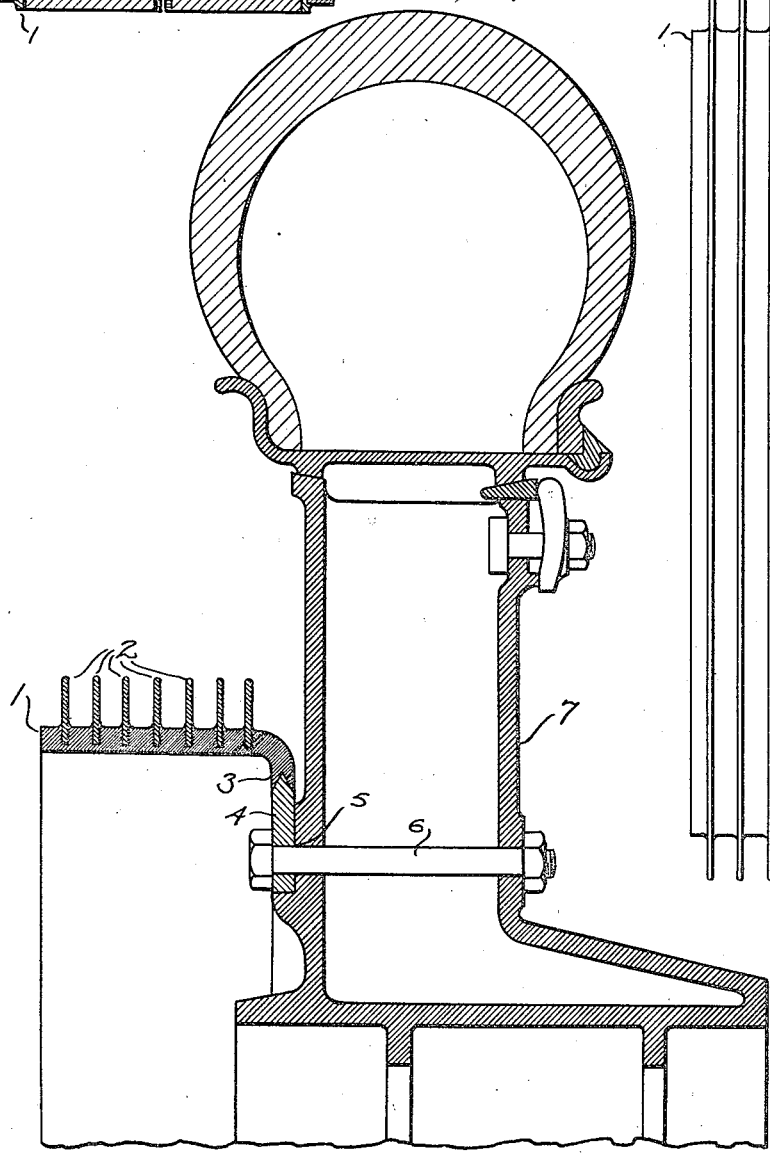
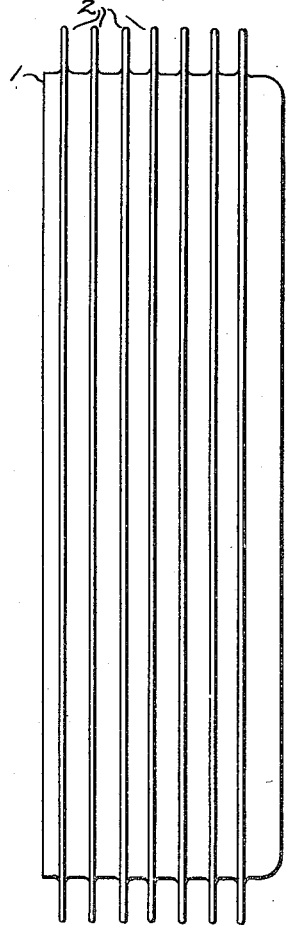
INVENTOR.
George Walther
BY Toulmin Toulmin
ATTORNEYS.

Nov. 6, 1923.

G. WALTHER

BRAKE DRUM

Filed July 31, 1922

INVENTOR.
George Walther
BY Toulmin & Toulmin,
ATTORNEYS.

Patented Nov. 6, 1923.

1,473,366

UNITED STATES PATENT OFFICE.

GEORGE WALTHER, OF DAYTON, OHIO.

BRAKE DRUM.

Application filed July 31, 1922. Serial No. 578,830.

*To all whom it may concern:*

Be it known that I, GEORGE WALTHER, a citizen of the United States, residing at Dayton, in the county of Montgomery and State of Ohio, have invented certain new and useful Improvements in Brake Drums, of which the following is a specification, reference being had therein to the accompanying drawing.

My invention relates to brake drums and particularly to brake drums used in connection with heavy automotive equipment.

It is my object to provide a brake drum of great strength and wearing qualities which shall have the minimum weight and minimum size. It is a further object to provide a brake drum which will accommodate a pair of internally expanding braking members.

It is a still further object to provide a brake drum of such very hard material as manganese and cooperating integral members therein to facilitate the attachment of the brake drum to the wheel and to facilitate the manufacture of the brake drum and to provide means for radiating heat therefrom.

It has been found that manganese steel is the most suitable material for this purpose but due to its great hardness it is impossible to machine it or otherwise work upon it except by the tedious process of grinding. To obviate the difficulty inherent in this material and to still secure it for the purpose desired, for which it is particularly fitted, I insert when casting the brake drum carbon steel inserts which may be machined, drilled, etc., in the customary manner. The carbon steel inserts are located adjacent the points of attachment and I also employ, if desired, carbon steel heat radiating fins which may be dressed and otherwise adjusted, which would not be the case if the fins were of manganese steel.

In the accompanying drawings;

Fig. 1 is a section of the brake drum being trued on a mandrel while still hot;

Fig. 2 is a section through a wheel and the brake drum supported thereby, being taken on the line 2—2 of Fig. 4 and looking in the direction of the arrows;

Fig. 3 is an end elevation of the brake drum; and

Figure 4:
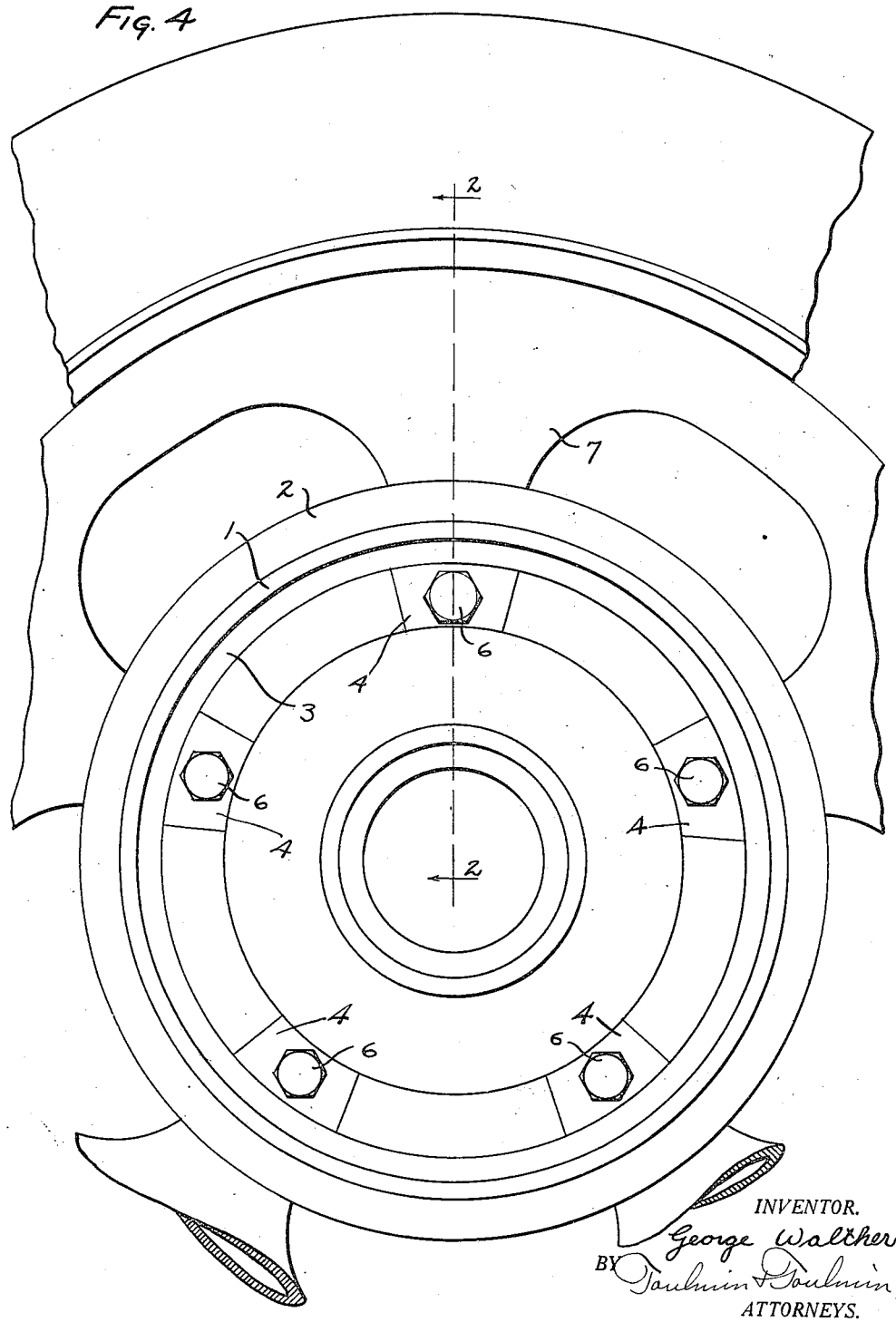
Fig. 4 is an elevation of the assembled brake drum and wheel looking at the assembly from the inside of the vehicle.

Referring to the drawings in detail, 1 is a cylindrical member constituting the brake drum of manganese steel having on the periphery thereof and inserted therein during casting a plurality of spaced carbon steel heat radiating fins 2. The brake drum is provided with an angular lip or rim 3 in which, at intervals, there are located carbon steel inserts 4 which are drilled with apertures 5 for the insertion of the retaining bolts 6. These retaining bolts are carried by the spokes 7 of the wheel.

It will be understood that there are a plurality of these inserts and a plurality of retaining bolts.

In producing these brake drums after casting it will be found that they are not exactly true and in order to bring them to size while still hot I provide an expanding mandrel 8 shown in Fig. 1, upon which the brake drums are placed. They are allowed to cool upon this mandrel in its expanded position and upon cooling the mandrel is collapsed and the drum removed. This drum may be of any desired character.

After this operation the inner surface of the brake drum to which the braking members will be applied is carefully ground. The grinding operation is possible with this steel but drilling or other machining is impracticable.

In order to facilitate such an operation the carbon steel inserts 4 are provided which may be readily drilled to receive the bolts 6.

The fins 2 may also be suitably dressed, if desired.

It will be noted that the brake drum provides a thin relatively light wall of very great strength and wear resisting qualities.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In a brake mechanism, a drum and flange of high wear resisting qualities, and inserts therein of softer material.

2. In a brake mechanism, a drum and flange of high wear resisting qualities, and inserts therein of softer material, said inserts being located in the flange thereof with apertures in said inserts.

3. In a brake mechanism, a drum and flange of high wear resisting qualities, and inserts therein of softer material, said inserts being located in the flange thereof with apertures in said inserts, and a plurality of spaced radiating fins of material differing from the brake drum material located on the exterior thereof to radiate heat therefrom.

4. In a brake mechanism, a manganese steel body consisting of a braking surface and a supporting wall, carbon steel inserts in said supporting wall located at spaced intervals, said inserts being adapted to have apertures drilled therethrough for retaining bolts.

5. In a brake mechanism, a manganese steel body consisting of a braking surface and a supporting wall, carbon steel inserts in said supporting wall located at spaced intervals, said inserts being adapted to have apertures drilled therethrough for retaining bolts, and a plurality of hardened steel radiating fins on the exterior of the braking surface spaced from one another to radiate heat therefrom.

6. In a brake mechanism, a manganese steel braking surface and a plurality of hardened steel spaced inserts located on the exterior thereof to radiate heat therefrom.

In testimony whereof I affix my signature.

GEORGE WALTHER.